United States Patent
Wood

[11] 3,808,780
[45] May 7, 1974

[54] SEPARATOR MEANS FOR COMBINES

[76] Inventor: Kenneth D. Wood, 1826 Greenfield, Wichita, Kans. 67217

[22] Filed: Nov. 15, 1972

[21] Appl. No.: 306,514

[52] U.S. Cl................. 56/14.6, 130/27 M, 209/291
[51] Int. Cl............................................. A01d 45/02
[58] Field of Search...... 56/14.6; 209/290, 291–295, 209/238; 130/27 A, 27 M

[56] References Cited
UNITED STATES PATENTS

| | | | |
|---|---|---|---|
| 551,495 | 12/1895 | Landis............................. | 130/27 M |
| 2,069,735 | 2/1937 | Metcalf........................... | 130/27 M |
| 2,905,182 | 9/1959 | Wise................................ | 130/27 M |
| 3,619,997 | 11/1971 | Wood............................... | 56/14.6 |

*Primary Examiner*—Antonio F. Guida
*Attorney, Agent, or Firm*—John H. Widdowson

[57] ABSTRACT

A separator for combines has a reel and header, thresher cylinder, conveyor for moving threshed cereal grass, powering means and a housing comprising the combine structure thereof. The separator is comprised of an independently rotatable outer cylinder member having a duct therein and mounted within and powered by the combine. It has an inner cylinder with an air mover also powered by the combine in operation to recirculate air within the separator. In operation the outer cylinder while rotating receives threshed material from the conveyor, disposes same through a distributor to the stalk-grain separator and receives air from the air mover directing same through the duct to the central portion of the member against the outward motion of the grain, separating the grain from its stalk. Air is recirculated within the separator passing from the air mover through the duct, being discharged toward the central portion of the separator, passing through the inner cylinder member and into the air mover. The separator preferably has a dehumidifier having heat transfer coils within the duct and on the outside of the structure. The separator uses rotation and centrifugal force and opposed recirculating airflow to separate threshed cereal grass stalks and grain.

9 Claims, 9 Drawing Figures

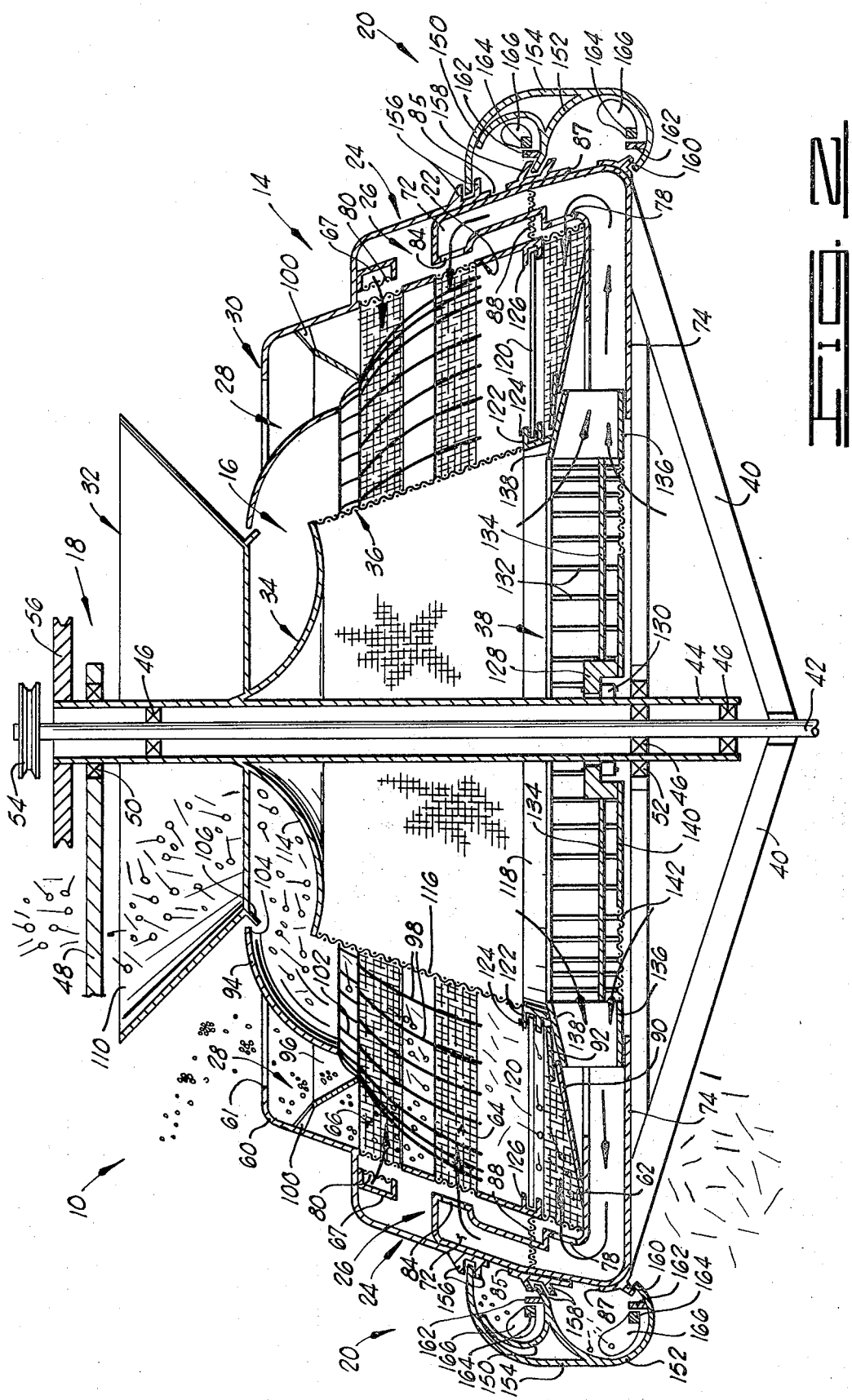

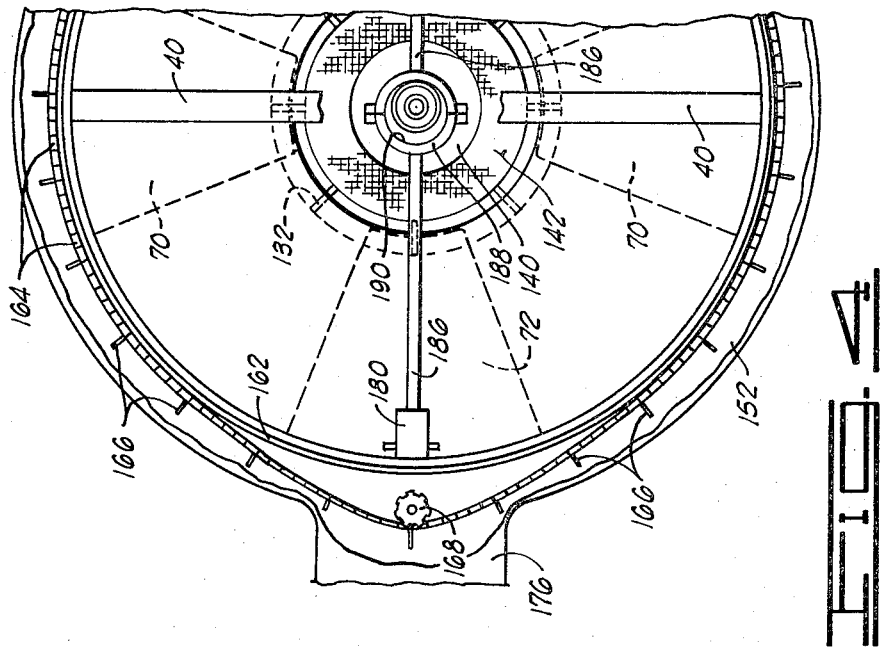
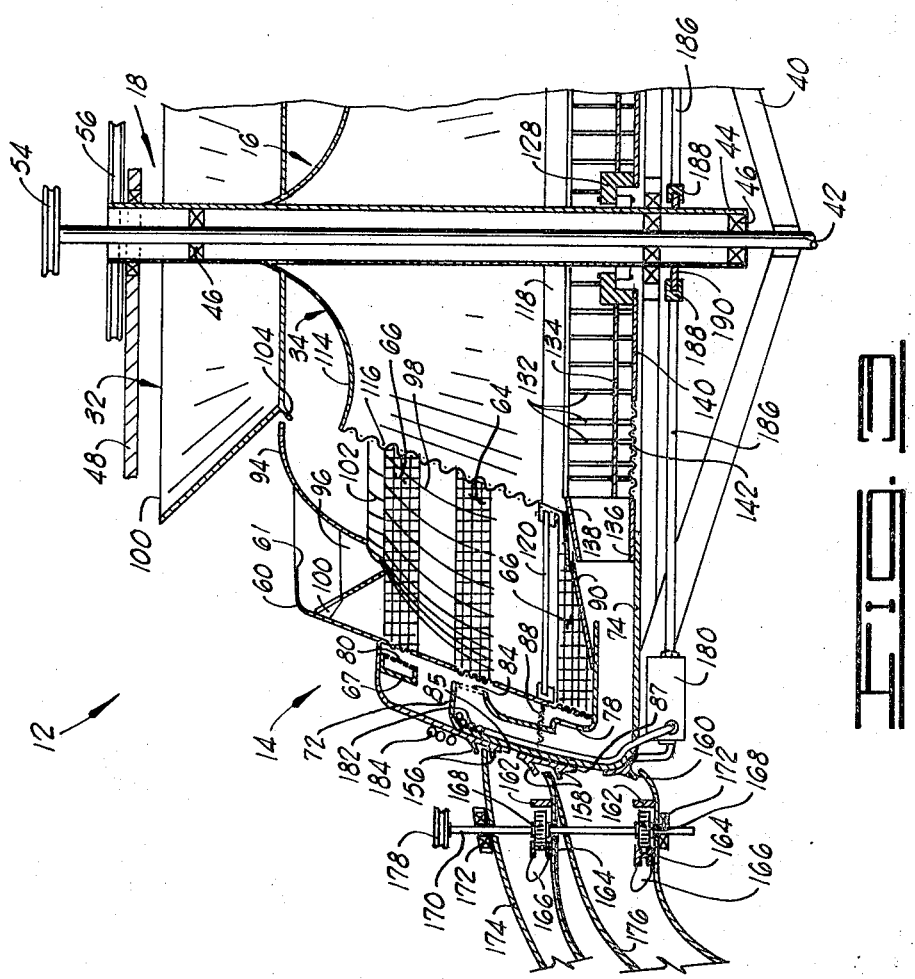

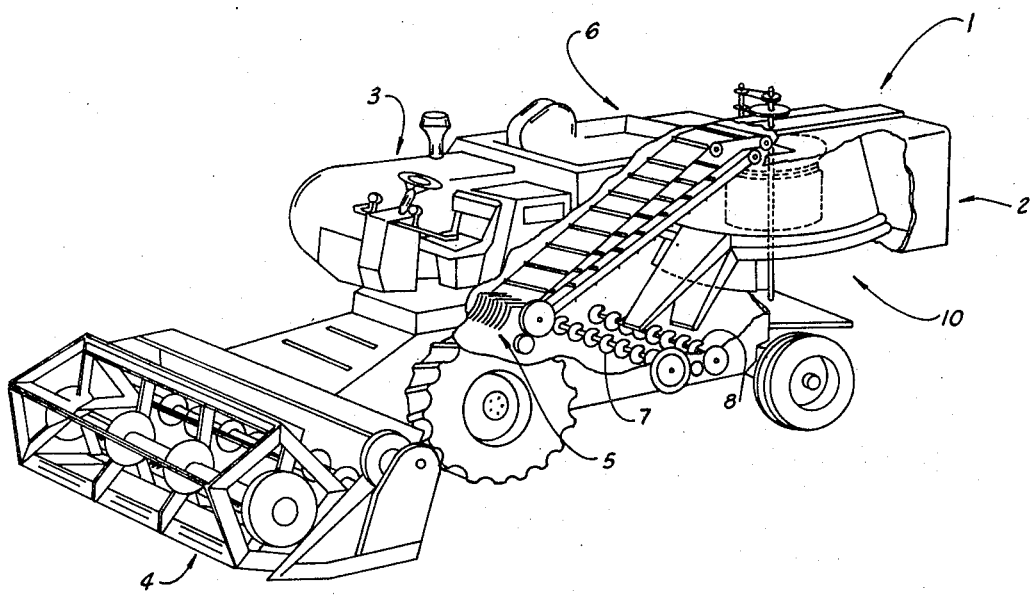
FIG-5
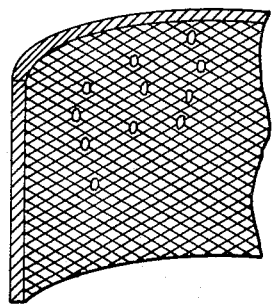
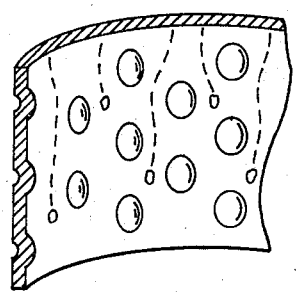
FIG-6
FIG-7
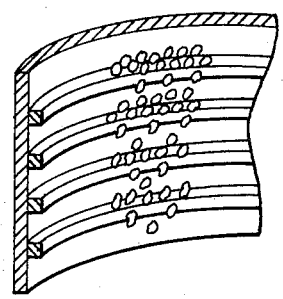
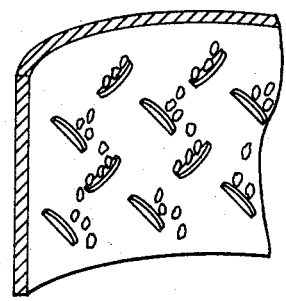
FIG-8
FIG-9

SEPARATOR MEANS FOR COMBINES

Many devices are known in the prior art for use in the harvesting of cereal grasses and in particular for the separating of the grass stalk from the grain. These prior art devices accomplish the separation by utilizing the mass difference in the grain and the stalk to which it is attached in order to separate them; this is done by centrifugal force or airflow or size difference in the grain and the stalk. Some of the prior art devices use two of the means for separating the gain and the straw, such as airflow and size difference or centrifugal force and size difference in the particles. Many of the prior art devices depend on the actual physical angular orientation of the device for their proper operation, thus do not function efficiently when tilted to a substantial degree such as is often encountered in hilly terrain. Most of the prior art devices are generally quite mechanically complicated and have many precisely formed moving parts, thus are difficult to construct and maintain in a proper operating condition.

This invention is an improvement on my Letters of Patent entitled *Separator Means for Combines* having U.S. Pat. No. 3,619,997, patented Nov. 16, 1971.

A preferred specific embodiment of the improved separator means for combines of this invention includes two coaxially rotatable cylinder members, with one inside the other with means to establish and recirculate an airflow therebetween same. The improved separator means described herein receives grain, spikes of grain, and some stalks with grain attached from the thresher cylinder of the combine and separate same in a recirculating airflow with the separated grain being directed to the storage compartment of the combine and the remaining attached grain and stalk particles directed again to the separator for further separation. The outer cylinder member has a duct assembly to direct air toward the center portion of the separator as it receives air from an air mover on the inner cylinder member. The inner cylinder member receives air through its perforated sidewall and passes same downward to the air mover. Grain as it is separated moves outward through perforations in the inner wall of the outer cylinder member and into a grain collector around the outer portion of the outer cylinder member. The stalk-grain separator has a trough mounted to turn with the outer cylinder member which receives mostly grain from the thresher cylinder of the combine and passes same outward in the direction of the outer cylinder's inner wall. The outer cylinder member has a perforate inner wall portion to pass air inward relative the separator and to pass grain outward relative to the center portion of the separator, and it has a duct between the inner wall and an outer wall with a grain collecting passageway surrounding the lower peripheral portion of the outer cylinder member. The gain passing into the grain collecting passageway is moved by a conveyor to the passageway outlet whereupon it is moved by auger apparatuses of the combine to the grain storage compartment. The improved combine separator means of this invention is mounted with an existing combine structure and the area where conventional combine separators are normally positioned, and it is connected with the driving apparatus of the combine including its thresher cylinder conveyor, its storage compartment augers and its powering apparatus for rotation of the cylinder members. Preferably, the cylinder members are connected with the combine structure so as to be rotatable at different and independently variable speeds.

In another preferred specific embodiment of the separator means for combines of this invention, such includes the improved combine separator structure of the first described preferred specific embodiment and further includes a dehumidifier apparatus for dehumidification of the recirculating airflow. The dehumidifier apparatus has a compressor mounted with the separator structure to rotate therewith which is driven by an eccentric on the inner cylinder member support shaft, and it has condenser coils within the duct in the outer cylinder member with heat exchanger coils on the outside of the outer cylinder member. In operation the dehumidifier apparatus operates to remove moisture from the air circulating within the improved separator structure. The dehumidifier apparatus is operated automatically upon rotation of the combine separator structure.

One object of the improved separator means for combines of this invention is to overcome the aforementioned disadvantages of the prior art devices.

Another object of this invention is to provide an improved combine separator with a new, novel, and simple means of efficiently separating threshed cereal grass or other similar material.

Another object of this invention is to provide an improved separator means for combines which can easily be mounted with existing popular styles of combines.

Another object of this invention is to provide an improved separator means for combines which will function efficiently without regard to the angle at which the combine structure may be tilted when operating as in rough or hilly terrain.

Yet, another object of this invention is to provide an improved combine separator structure which has an internally recirculating airflow used for separation of the cereal grass material.

Yet, another object of this invention is to provide an improved separator means for combines which has a dehumidifier apparatus to in operation dehumidify air within the separator structure with the dehumidifier being operable as the separator structure rotates.

Various other objects, advantages, and features of the invention will become apparent to those skilled in the art from the following discussion, taken in conjunction with the accompanying drawings, in which:

FIG. 2 is a cross-sectional elevation view of the improved separator means for combines taken through the center portion of the separator structure;

FIG. 3 is a cross-sectional elevation view of a portion of the improved separator means for combines including a dehumidifier apparatus, with the view taken through the center portion of the separator means showing more than one-half of the separator structure and the grain collector outlet;

Figure 1:
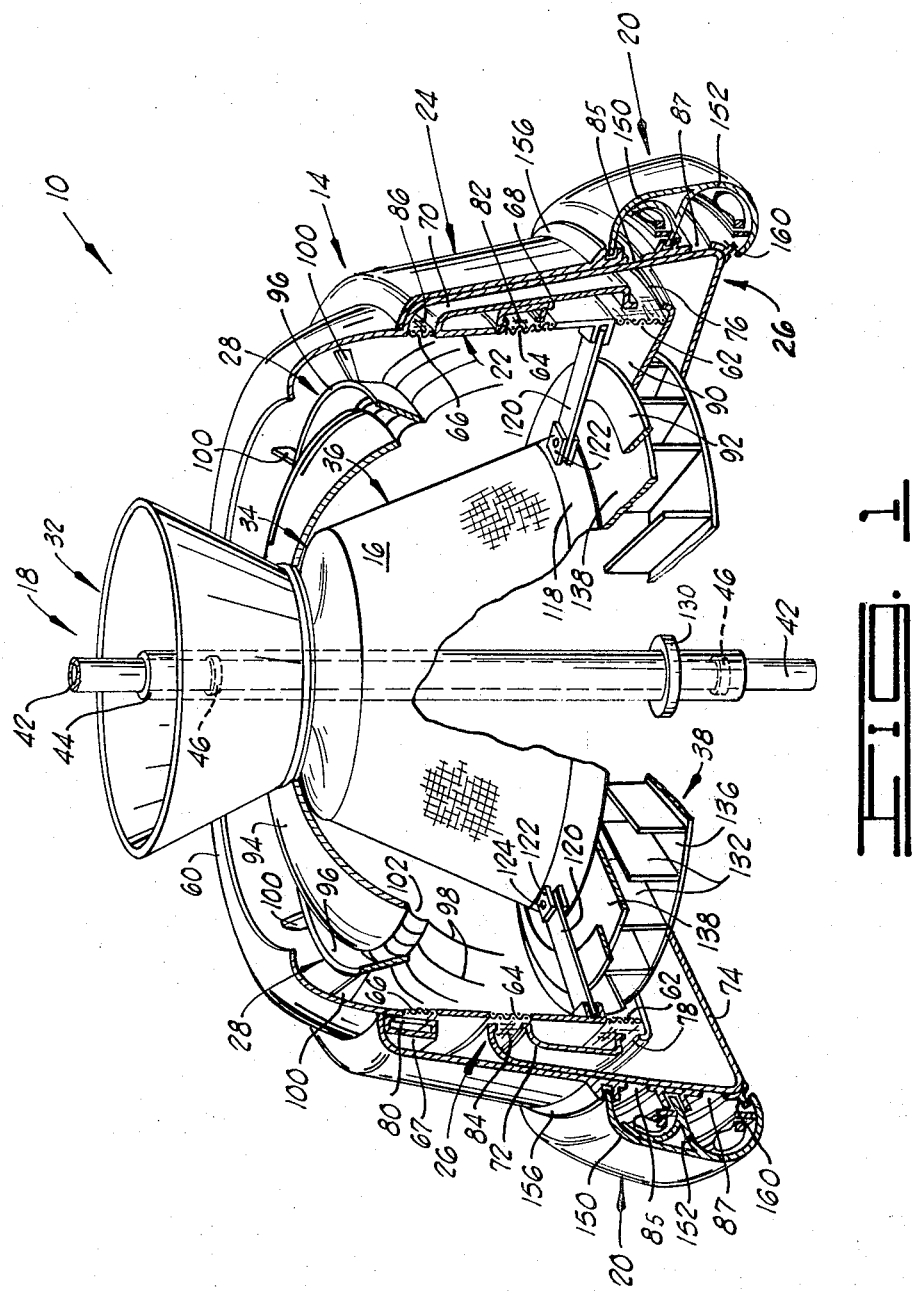
FIG. 1 is a perspective view of the improved separator means taken from above with sections thereof removed for clarity exposing the inner portions of the separator structure.

FIG. 4 is a bottom plan view of the improved separator means for combines shown in FIG. 3 and having portions of the lower grain collecting passageway and center support structure removed for clarity, and FIG. 5 is a frontal perspective view of a conventional combine of a typical and popular design having portions of same removed for clarity and having the improved separator of this invention operably installed therein;

FIG. 6 is a perspective view of a portion of the separator's inner wall, the wall portion having a knurled inner frictional surface with grain particles shown thereon and having dashed lines illustrating the paths of the grain particles;

FIG. 7 is a perspective view of a portion of the separator's inner wall, the wall portion having dimpled inner frictional surface with grain particles shown thereon and having dashed lines illustrating the paths of the grain particles;

FIG. 8 is a perspective view of the portion of the separator's inner wall, the wall portion having an inner frictional surface with a plurality of circumferential rings or ribs with grain particles shown thereon creeping or flowing thereover and having dashed lines illustrating paths of the grain particles; and FIG. 9 is a perspective view of the portion of the separator's inner wall, the wall portion having an inner frictional surface with a plurality of ribs at various angles relative to the horizontal plane with grain particles shown thereon creeping or flowing thereover and having dashed lines illustrating paths of the grain particles.

The following is a discussion and description of preferred specific embodiments of the improved separator means for combines of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1 and FIG. 2, an embodiment of the improved separator means for combines of this invention is shown therein and generally indicated at 10. Additionally referring to the drawings in detail and in particular to FIG. 3 and FIG. 4, shown is another embodiment of the improved combine separator means of this invention generally indicated at 12, having a dehumidifying apparatus. The improved combine separator means of this invention is shown in embodiments thereof which are functionally the same and have the same structure with the distinction between them being the apparatus included with an embodiment for the specific purpose of purposely dehumidifying the recirculating air within the separator means structure. The improved separator means for combines of this invention is adapted to be mounted in and operated by a conventional combine as shown in FIG. 5 and generally indicated at 1. The combine 1 includes a housing structure 2, a suitable powering device 3, for example, an internal combustion engine, a reel and header assembly 4, a thresher cylinder assembly 5, and a conveying system 6 for conveying threshed cereal grass from the thresher cylinder assembly 5 to the separator 10. The conveying system 6 includes a grain storage compartment auger 7 which receives grain from the separator and moves it to a storage compartment and a recycling auger 8 which receives unseparated material for recycling through the conveyor system 6 to the separator 10, Referring to the drawings in detail and in particular to FIG. 1 and FIG. 2 and the improved separator means for combines 10 shown therein, such includes an outer cylinder member 14 and an inner cylinder 16 supported on vertical coaxialar shafts generally indicated at 18. In operation cereal grass, for example, is cut by the combine's header assembly and separated from the stalk or stem portion to a great extent by the combine's thresher cylinder then fed into a conveyor system which deposits the material in the separator. Normally, the separator is positioned in the rear portion of a combine and receives threshed material from the conveyor system which has two conveyors, one transporting mostly grain, grain spikes and some stalk material and the other conveyor carrying mostly stalk material with grain attached and some grain. The conveyor carrying mostly grain deposits same in the receiver portion of the outer cylinder member 14 and the conveyor carrying mostly stalk material with grain attached deposits same in the receiver portion of the inner cylinder member 16. The combine structure and conveyor structure are not shown in the drawings as they are not deemed necessary for a proper explanation of the operation of the improved separator means of combines of this invention and they may differ in structural arrangement depending upon the particular combine in which the separator means of this invention is used. The improved separator means for combines is driven from the powering apparatus of the combine in which it is mounted generally the same as conventional combine separators are mounted and operated. In this case, the improved combine separator is shown with pulleys on the shafts thereof to be connected with belts for rotating of the movable parts of the separator.

In FIG. 1 and FIG. 2 the improved separator means structure 10 is shown in a cut away in a sectional form to expose the interior operating portions thereof. The separator 10 has the outer cylinder member 14 and the inner cylinder member 16 attached to an upright shaft assembly 18 for their rotation about an upright and generally vertical axis and additionally has on the lower peripheral portion thereof a stationary grain collector, generally indicated at 20. In operation the cylinder members 14 and 16 rotate while the grain collector remains stationary as it is connected with the grain transferring passageways of the combine structure. The outer cylinder member 14 has an inner wall portion 22, an outer wall portion 24 with the duct assembly 26 between the inner and outer walls and on the upper interior portion thereof a stalk-grain separator generally indicated at 28. Material is received into the inner cylinder member 14 through a receiver portion generally indicated at 30 comprising an opening on its normally upper portion. The inner cylinder member 16 is rotatably supported within the outer cylinder member 14. The inner cylinder 16 receives grain and stalk material from the combine conveyor on an imperforate cylinder to portion 34 below the receiver portion 32, and has a perforated cylinder wall portion 36 and an air mover or fan 38 on its lower portion connected with the duct assembly 26 of the outer cylinder member 14. In operation the combine conveyor drops material which is mostly stalks with grain included into the inner cylinder receiver portion 32 whereupon it falls onto the inner cylinder top portion 34 and is dispersed therefrom to the stalk-grain separator 28. In operation the inner cylinder 16 and the outer cylinder 14 can be rotated at different relative speeds.

Support of the combine separator 10 within the combine structure is accomplished by having the grain collector 20 rigidly mounted with the structure of the combine within its housing; such mounting is not shown in detail in the drawings, and having the shaft assembly supported above and below the separator structure. Rotation of the outer cylinder member 14 is accomplished by supporting it from below with transverse beams 40 connecting the lower portions of the outer cylinder member 14 to the center shaft 42 which is rotatably supported below the separator structure (by amount not shown) and supported above the separator structure along with another shaft. Support of the inner cylinder member 16 is accomplished by having a cylindrical shaft 44 therearound a portion of the other shaft 42 and spaced therefrom by bearings 46, mounted with a portion of the combine structure 48 on its upper end by bearings 50 on the outside of the cylindrical shaft, and further connected with the outer cylinder member on its lower portion by another bearing 52 on the outside of the cylindrical shaft. The shaft assembly 18 has one pulley 54 mounted with the inner shaft 42 and another pulley 56 mounted with the outer cylindrical shaft 44 for rotation of the inner cylinder member 16.

Structure of the improved combine separator's outer cylinder member 14 is shown in detail in FIG. 1 and FIG. 2 and described herein with reference to both figures. The outer cylinder member 14 is basically a double-walled structure having a circumferentially perforated portion on its inner wall, connected to the stationary grain collector 20 on its lower peripheral portion of its outer wall, and containing a duct assembly having a duct between the walls connecting a fan on the lower portion of the separator with a portion of a circumferential perforated portion of the inner wall. The outer cylinder member 14 is the exposed portion of the combine separator; it is generally shaped like the frustrum of a cone and is surrounded by the grain collector 20 on its lower peripheral portion, and contains the fan 38 in its lower portion and between its inner and outer walls 22 and 24 and also contains the duct assembly 26. The duct assembly 26 consists of preferably a plurality of ducts from the fan 38 through the walls 22 and 24 with openings through the inner wall to permit air communication with the inner cylinder member 16. Additionally, the outer cylinder member 14 has supported from its interior the stalk-grain separator 28. The basic function of the outer cylinder member 14 is to direct air toward the central portion of the combine separator through the duct assembly 26 and receive in an opposite direction grain separated from grain and chipped grain and stalks passing the separated grain into a portion of the grain collector 20 for transmission to the combine storage container, and passing the chopped grain and stalk material into another portion of the grain collector for recycling to the separator 10, and providing a portion of the means to recirculate air within the separator 10.

In regard to the shown structure details of the improved combine separator means 10 and in particular the outer cylinder member 14, the inner wall portion 22 extends above the outer wall portion 24 and has on its upper portion a receiver portion 30. The inner wall 22 on its upper end has an inwardly curved portion 60 with an aperture 61 on the inner side thereof. On the portion of the inner wall 22 within the outer wall 24 it has three perforated portions extending circumferentially therearound a lower perforated portion 62, a central perforated portion 64 and an upper perforated portion 66. These perforated portions are shown with screens in the drawings; however, such may be of a mesh or other perforated structure as will operably pass air and grain. The inner wall 22 has a frictional surface on the inner side thereof to in operation slow grain particles in their downward path so they will not overshoot the perforated portions 66 or 64 and so they will not be cracked or damaged by impacting with the lower portions of the structure. The frictional surface of the inner wall 22 can be knurled as shown in FIG. 6 or dimpled as shown in FIG. 7, or it can have a plurality of circumferential rings or ribs as shown in FIG. 8. A knurled or dimpled wall would cause the grain particles to turn and twist around the protrusions while rings or ribs would cause the grain to build up and creep or flow over them. Ribs at various angles relative to the horizontal plane as shown in FIG. 9 would cause grain to build up and creep or flow over them, or inertia due to acceleration changes would apply opposing vertical forces on the material. Between the inner wall 22 and the outer wall 24 is the duct assembly 26; such includes an upper annular duct 67 adjacent to the upper perforated portion 66 of the inner wall 22, a lower annular duct 68 adjacent to the center perforated portion 64, an upper duct connector 70 joined with the upper annular duct 67, a low duct connector 72 connected with the lower annular duct 68, a fan connecting duct 74 joining the fan 38 with the upper connector duct 70 and the lower connector duct 72, outlets to the lower perforated portion 62 at 78 and to the upper duct connector 70 at 86 and to the lower duct connector 72, at 84, and outlets 85 and 87 through the outer wall 24 to the grain collector 20 in its lower portion. The inner side of the annular upper duct 67 is perforated as indicated at 80 to allow air to pass from the upper duct connector 70 through the upper annular duct 67 and into the inner portion of the outer cylinder member 14 through the upper perforated portion 66 of the inner wall 22. Similarly, the inner portion of the lower annular duct 68 is perforated on its inner side as indicated at 82 to allow air to pass through the lower duct connector 72, into the lower annular duct 68 and into the inner portion of the outer cylinder member through the center perforated portion of the inner wall 22. At the juncture of connector duct outlet portions and the annular ducts 67 and 68, the upright duct portions are preferably smoothly joined with the annular ducts. The lower duct connector 72 has its outlet 84 aligning with the center perforated portion 64 thereby allowing unrestricted airflow through that portion of the inner wall 22. The upper duct connector 70 has its outlet 86 at its juncture with the upper annular duct 67 to allow an unrestricted flow of air through the upper perforated portion 66 of the inner wall 22. In operation air passes from the ducts through the inner wall 22 and at the same time grain and chopped grain stalks pass in a reversed direction through the perforated portions of the inner wall and into the space between the inner wall 22 and the outer wall 24 whereupon it passes to the grain collector 20 through the outlets 85 and 87. In the lower portion of the outer cylinder member 14 between the inner wall 22 and the outer wall 24 is a horizontal partition portion or screen indicated at 88 spaced slightly above the lower perforated portion 62; this partition extends radially between the walls completely around the outer cylinder member 14 except in the spaces of the duct connectors 70 and 72. On the bottom portion of the outer cylinder member 14 the fan connecting duct 74 of the duct assembly 26 connecting the fan 38 with the duct connectors 70 and 72 has a rotatable connection at the duct members 74 and 90 with a seal 92 joining same with the fan 38.

The grain-stalk separator structure 28 is supported from the upper interior portion of the outer cylinder member 14 and rotates with the outer cylinder member. The grain-stalk separator 28 has a dome shaped portion 94 extending upward into the receiver portion of the outer cylinder member 14, with a plurality of prongs 98 extending outward and downward from the trough 96. The stalk-grain separator 28 is supported from the inner wall 22 by a plurality of braces 100 connected between the upper portion of the inner wall and the trough 96. The prongs 98 extend downward and radially outward from the lower portion of the trough 96. One portion of the trough 96 is formed by a radially outward and upwardly extending member which is secured to the braces 100; the other side of the trough is formed in part by the lower portion of the domed member 94, and in part by a perforated section 102 joining the lower portion of the dome 94 and the bottom of the trough 96. The perforated portion 102 has openings that can be formed, as shown, by extending the prongs 98 upward from the bottom of the trough 96 joining them with the bottom portion of the domed portion 94. In the center of the domed portion 94 is an aperture 104 to be connected with a seal on the inner cylinder receiver 32. Cooperation between the dome aperture 104 and receiver seal 106 provide a stabilizing effect which may be necessary in view of rotational movements between the inner cylinder receiver 32 and the stalk-grain separator 28. If necessary, the juncture of the dome aperture 94 and the inner receiver 32 can be fitted with a bearing to provide additional stabilization.

The inner cylinder member 16 functions in a cooperating relationship with the outer cylinder member 14 and includes the receiver portion 32, the cylinder portion having an imperforate top 34 with a perforated wall 36 and including the fan 38. The inner cylinder receiver 32 is an open funnel-like member 110 larger at the top than at the bottom and joined at the bottom portion with the stalk-grain separator dome portion 94 as described. The receiver member 110 is supported from the combine housing structure and remains stationary. The imperforate cylinder top portion 34 has a generally conically shaped top member 114 attached to the cylindrical shaft 44 on its apex portion and extending downward therefrom. Preferably, the top member 114 is shaped as shown in FIG. 2 having a downwardly concave shape with the perforate cylinder wall 36 connected therewith on its outer peripheral portion. The perforate cylinder wall 36, as shown in the drawings is a screen member indicated at 116 and generally formed in the shape of a frustum of a cone being smaller on its upper portion where it is attached to the cylinder top member 114. The perforate cylinder wall 36 can be formed of a mesh material such as metal screening or it can be formed of a mesh cloth material, for example, nylon, and be removable from the inner cylinder member. On the lower edge portion of the inner cylinder member 16 is a connector ring portion 118 joining the perforated inner cylinder wall 36 with the fan 38. On the outer portion of the connector ring is mounted a plurality of chopper blades or knives 120 supported in fixtures 122 on the connector ring 118.

The chopper blades or knives 120 span the space between the inner cylinder 16 and the inner wall 22 of the outer cylinder member 14. The chopper blades 120 are preferably pivotally attached at the fixtures 122 by a pivot pin 124 so they will move to a generally radial position unless striking material and return to same after striking straw and the like. The outer end portion of the chopper blades 120 passes in guide fixture 126 secured to the outer cylinder inner wall 22. In operation the chopper blades or knives 120 have their outer end portion in the guide 126 when in a radially extending portion. The fan 38 is attached to the cylindrical shaft 44 and is preferably constructed as shown in the drawings a radially bladed and ducted fan with the blades spaced a distance from the supporting shaft and having a flow separating partition therein. The fan 38 has a hub portion 128 attached to a mount 130 on the cylindrical shaft 44 with the plurality of blades 132 supported in part by the flow divider member 134 extending from the hub portion 128 and attached to the blades. The blades 132 are ducted and supported by ring plate members 136 and 138 on their lower and upper portions, respectively, as shown clearly in FIG. 1 and FIG. 2. The lower portion of the fan 38 has a partial cover portion 140 and an open portion covered by a mesh screen 142 which provides one entrance into the fan. The primary air entrance into the fan is through the upper portion thereof through the aperture formed by the ring member 138; the secondary entrance into the fan is through the mesh screen 142 on its opposite side. The fan blades 132 are preferably shaped as shown in FIG. 2 with the inlet portion thereof larger than the outlet portion thereof and mounted with the ducting rings 136 and 138 in the position shown so as to move air from the interior of the inner cylinder member 16 to the duct entrance portions 74. The seal 92 contacts the upper ducting ring 138 for the purpose of preventing air escape and preventing straw and grain material from entering the airflow. In normal operation of the improved combine separator 10 air passes from the space between the inner cylinder member 16 and the outer cylinder member 14 through the perforated inner cylinder wall 36, through the fan 38, and into the duct apparatus 26 at the outlet of the fan blades. The air exits the duct assembly 26 at the duct outlets 84 and 86 and through the outlet portions of the upper annular duct 67 and lower annular duct 68 into the space between the inner cylinder member 16 and the outer cylinder member 14 in the area of the stalk and grain separator prongs 98. The arrows on FIG. 2 of the drawings indicate the normal airflow when in operation. It is to be noted that additional air or supplemental air passes into the fan 38 through the lower portion below the fan flow divider member 134 and passes into the airstream. The supplemental air is necessary to replenish the air which is lost through the grain collector 20 and through the straw discharge passageway on the bottom of the separator 10 to add dry air to the separator for an inherent dehumidification of the recirculating air.

The grain collector apparatus 20 is stationary relative to the rotating portions of the improved combine separator 10 and is mounted with the combine structure and housing. It is connected to the grain handling apparatus of the combine which carries same to the grain storage compartments of the combine structure. The grain collector 20 has two separate passageways there-around the lower peripheral portion of the outer cylinder member 14, the passageways are in communication with the space between the inner and outer walls 22 and 24 to receive grain and chopped stalk material with grain attached in the separate passageways for directing the grain to a grain auger and directing the chopped stalk with grain attached to a recycling auger. The grain collector 20 has an upper passageway 150 and a lower passageway 152 extending therearound the lower peripheral portion of the outer cylinder member 14, the passageways being connected for structural support by a circumferential member 154 which forms a structural support and a portion of the passageway. The upper passageway 150 is in communication with the space between the cylinder walls 22 and 24 by the slotted aperture 85 and the lower passageway 152 is in communication with the same space through the other slotted aperture 87. The passageways have a continuous slot aperture therearound which is blocked in portions by the connecting portions of the duct assembly 26. To achieve a closed fluid communication seals are provided between the outside of the outer wall 24 and the edge portions of the grain collector passageways with the upper portion upper passageway's seal indicated at 156, the center passageway seal indicated at 158 and a lower passageway seal indicated at 160. The seals 156, 158, and 160 provide separation between the passageways 150 and 152 and prevent an undue loss of air and grain material at the moving juncture of the grain collector 20 and the outer cylinder member 14.

On the interior of the passageways 150 and 152 is provided a grain moving apparatus in the form of a chain conveyor with paddles to move the grain and other material through the passageway around the separator structure to deposit same in the outlets of the passageways. Each of the passageways has an upright fence 162 in the bottom thereof to serve as a guide for the chain 164. A roller chain 164 is positioned in the bottom of the passageways against the guide 162. The roller chain 164 has a plurality of paddle members 166 extending from the outer side portion thereof as shown in the drawings and attached to the chain in a spaced relation so as the chain is pulled through the passageways, the paddles 166 will move the grain in the bottom of the passageway. In operation the roller chain 164 is pulled along the guide 162. Motion of the roller chain through the passageways is accomplished as shown in FIG. 3 and FIG. 4 wherein a sprocket 168 mounted on an upright shaft 170 supported by bearings 172 mounted on the passageway outlets 174 and 176 as the shaft 170 is turned by the powering apparatus of the combine. The shaft 170 as shown is fitted with a pulley 178 to make it easily connectable with the combine powering device. The passageway outlets 176 and 174 are provided with a large, flat-like bottom portion in the area of the sprocket to enable it to operate properly in pulling the chain around the passageway. Preferably, the speed at which the chain can be moved is variable so that it can be operated with such speed as is necessary depending upon the quantity and type of grain being cut with the combine. Additionally, the passageway conveyor chain apparatus is preferably operable independent of the other motions of the combine so it can be operated to empty the passageways as needed. The paddles 166 are preferably formed in a shape which conforms to the general shape of the outer portion of the passageway in which they move so as to move a maximum amount of grain without loss or inefficient operation. It is to be noted that the passageway conveyor apparatus shown and described herein can be accomplished with a conveyor-like means other than the roller chain and paddle structure shown. An example of an alternate conveyor apparatus is a flexible screw auger.

In the operation of the improved combine separator 10 of this invention, the inner cylinder member 16 and the outer cylinder member 14 are rotated by the powering apparatus of the combine and the grain collector passageway auger is also rotated by the powering device. Material in the form of cereal grass stalks with grain included enters the inner cylinder receiver 32 and at the same time material which is mostly grain and grain spikes enters the receiver portion 30 of the outer cylinder member. The material which is primarily grain with stalk included is spun off of the inner cylinder top member 114, contacts and slides down the frictional surface of the inner side of the stalk-grain separator dome 94 due to the momentum imparted to it by the rotating inner cylinder; some of the grain then enters the trough 96 through the open portion 102 and other portions of the material which have stalk attached are struck by the prongs 98 whereupon the grain is knocked from the stalk. Material which is not separated at this time passes further down and is struck by the chopper blades or knives 120 thereby being cut into smaller pieces a portion of it will pass through the lower perforated portion 62 of the inner wall 22, then into the lower passageway 152 for return to be recycled to the separator the majority of such material will be exhausted through the bottom of the separator 10. The material which is mostly grain and grain spikes enters the trough and is given momentum by the wall portion 96 of the stalk-grain separator and the perforated portion 102 and dome portion 94 of the opposite side of the trough. At this point, some of the grain material drops downward through the trough while other particles are forced upward from the trough and contact the inner side of the inner wall 22 then begin making their way down the wall to the perforated portions 66 and 64. The airflow during operation of the separator 10 is between the air outlets within the outer cylinder member 14 in the direction of the inner cylinder member 16. As grain moves downward through the separator particularly in the areas of the outlets, the grain is separated from the stalk by the mass difference of the particles under the forces of the air and centrifugal force with the overall effect of allowing the grain to move against the direction of the air due to its denser mass, whereas the stalk portions of the material due to their lesser mass density are blown away and are exhausted through the bottom of the separator 10. The airflow through the combine separator is forced by the fan 38.

In another embodiment 12 of the improved combine separator means of this invention, such is shown in FIG. 3 and FIG. 4 and is structurally the same as the combine separator 10 of the first described embodiment of the invention which is shown in FIGS. 1, 2, 6, 7, 8 and 9, and additionally includes a dehumidifying apparatus operable to dehumidify the recirculating air within the separator structure. The separator 12 of this embodiment is constructed and adapted to be used in and powered by the combine shown in FIG. 5. The dehumidifier apparatus is a recirculating gaseous system having a compressor 180 mounted with the lower portion of the separator structure, condenser coils 182 in the duct apparatus 26, heat exchanger coils 184 on the outside of the outer cylinder member 14 and controls as needed to regulate the operation. The compressor is driven from the shaft assembly 18 by a connecting rod 186 mounted with a rotating mount 188 to an eccentric 190 attached to the cylindrical shaft 44. Preferably, a pair of compressors are used, such being placed on opposite sides of the separator structure and driven from the same eccentric 190 and attached to the same pivot mount 188. As shown in FIG. 3 the condenser coils are in the upper portion of the lower connector duct 72; they can also be placed in the upper connecting duct 70 and can extend through the annular passageways 67 and 68 if necessary to accomplish the desired amount of dehumidification. Small apertures (not visible in the drawings) are provided between the adjacent areas of the condenser coils 182 and the exterior of the combine separator being vented to the atmosphere so as to provide an outlet for the condensed moisture. The heat exchanger coils 184 are preferably placed about the exterior upper portion of the outer wall 24 so as to provide good heat transfer. Since the compressors rotate with the outer cylinder member 14, they operate when there is a speed differential between the inner cylinder member 16 and the outer cylinder member 14.

An inherent advantage in the dehumidifier structure shown is that the compressors 180 and coils 182 and 184 rotate with the outer cylinder member 14 so there is no problem with swiveling connections for the gases used in its operation and the other fixtures necessary for proper operation of the dehumidifying apparatus. Also, other necessary operating elements such as control switches, expansion valves and so forth can be securely attached to the structure of the outer cylinder member 14. In operation the improved separator means for combines 12 functions exactly the same as the previously described embodiment of the invention, only that the dehumidifier operates when there is a relative speed difference between the inner cylinder member 16 and the outer cylinder member 14 and that the air recirculated and passing through the duct assembly is dehumidified specifically by the dehumidification apparatus described thereby allowing the combine separator to operate with drier air than it normally would if the dehumdification apparatus was not present.

In the use and operation of the improved separator means for combines of this invention shown in FIGS. 1, 2 and 6-9, it is seen that same provides a means to separate threshed cereal grass or a like material by the use of two rotating coaxial cylinder-like members in the presence of a recirculating airflow. In an additional embodiment of the invention the separator means shown in FIGS. 3, 4 and 6-9, is provided with a dehumdification apparatus for dehumidifying the recirculating airflow within the separator structure. The outer cylinder member 14 receives grain and has ducts to direct the recirculating airflow, and a grain collector to receive and collect the separated grain and receive and collect material for recycling through the separator. The inner cylinder member 16 receives on its top side grain and stalk material, passes air through its sidewall and has a fan on the bottom thereof connected with the duct assembly 26 of the outer cylinder member 14. In the embodiment of the improved separator means for combines having the dehumidification apparatus, the structure is the same as described and additionally has a compressor mounted with the outer cylinder member 14 that is driven by the shaft assembly 18 which supports the inner cylinder member 16 and outer cylinder member 14; it has condenser coils in the duct assembly 26 and heat exchanger coils on the exterior of the separator. The compressor is driven by an eccentric on the cylindrical shaft which supports the inner cylinder member 16 and it is driven at a rate corresponding to the relative rotational speed difference between the inner cylinder member 16 and the outer cylinder member 14. It is to be understood that the improved combine separator means of this invention can be used to separate several types of grains and cereal grasses; for example, oats, barley, wheat, alfalfa, flax, bermuda grass, blue grass, corn, maize, soybeans, and milo.

As will be apparent from the foregoing description of the applicant's improved separator means for combines, a novel and efficient means has been provided to separate threshed cereal grass stalks and grain by using centrifugal force and opposed airflow in a separator structure which has a recirculating airflow and is adaptable with existing and conventional combines of the currently popular design. The separator means in an embodiment has a dehumidification apparatus to remove moisture from the recirculating airflow thereby operating in a drier environment than possible without the dehumidifier. The separator means is efficient in operation and will operate without regard to the specific type of cereal grass or terrain in which the combine is being operated. The separator means is simple in design, uses a recirculating airflow, and is easily manufactured and adapted to existing combine structures.

While the invention has been described in conjunction with preferred specific embodiments thereof, it will be understood that this description is intended to illustrate and not to limit the scope of the invention, which is defined by the following claims.

I claim:

1. In a combine having a reel and header assembly, a thresher cylinder, conveying means for threshed cereal grass therefrom, powering means, and housing means comprising the structure of said combine, therein and therewith the separator means of this invention comprising:

a. an outer hollow imperforate member open on its upper and lower portions rotatably mounted on a substantially vertical axis in said combine structure and connected to said powering means to be rotated in operation by same, b. said outer member being in communication with said conveyor means to receive therefrom in operation threshed cereal grass and said outer member having means to direct air radially inward therethrough itself, c. means mounted relative said outer member in operation to recirculate air within said outer member, d. dispersing means and stalk-grain separator means in the upper interior portion of said outer member mounted to and in operation receiving substantially all the threshed grain from said conveyor means in said dispersing means and transferring same to said stalk-grain separator means, e. grain collecting means around said outer member on the lower portion thereof, and f. a plurality of stalk-grain separating members on said stalk-grain separator means which in operation separate grain from its stalk and directs free grain to said grain collecting means.

2. A separator means as described in claim 1, wherein:
 a. said means mounted relative said combine structure in operation to recirculate air has a fan means rotatably and coaxially mounted about said vertical axis enclosed within said outer member having an inlet within said outer member and a duct means mounted with its outlet, said duct means being said means to direct air inward relative said outer member,
 b. said fan means is connected to said powering means to be rotated in operation by same independent of said outer member, and
 c. said means to recirculate air has an inner cylinder member with an imperforate upper surface and a perforate sidewall, said perforate sidewall connected with said fan inlet, in operation said inner cylinder member receiving a portion of said threshed cereal grass from said conveyor means on said upper surface for dispersal to said stalk-grain separator means and said recirculating air is received through said perforate sidewall and passed to said fan means.

3. A separator means as described in claim 2, wherein:
 a. said outer member is rotatably attached said combine housing by a normally vertically disposed shaft member along its longitudinal axis,
 b. said fan means and said inner cylinder member are rotatably attached said vertically disposed shaft by a cylindrical shaft and are adapted to be rotated independently thereof,
 c. said vertically disposed shaft extends from said inner cylinder member and is rotatably attached said combine housing below said separator means and said cylindrical shaft is attached said vertically disposed shaft within said separator means and attached said combine housing above said separator means, and
 d. said vertically disposed shaft and said cylindrical shaft are attached said powering means which provides power therefor and has means to vary the rotational speed of said inner cylinder member and said fan means relative to said outer member.

4. A separator means as described in claim 3, wherein:
 a. said inner cylinder member has a substantially porous cylinder wall,
 b. said inner cylinder member has a plurality of elongated blades extending radially from the lower outer portion thereof and said blades substantially span the space between said inner cylinder member and said outer member, and
 c. said upper surface of said inner cylinder member is generally conically shaped, having the sides thereof concaved and having the apex portion thereof attached said cylindrical shaft.

5. A separator means as described in claim 4, wherein:
 a. said duct means has a receiving passageway portion with the inlet in communication with said fan means and having a dispersing passageway portion joined said receiving passageway portion and having a duct outlet positioned to direct air inward relative said separator means,
 b. said outer member has a perforate inner wall with an opening at said duct outlet in operation to pass air inward relative said separator means through said inner wall opening and pass separated grain outward relative said separator means through said inner wall opening, and
 c. said grain collecting means is in communication with said inner wall opening in operation to receive grain therefrom said duct.

6. A separator means as described in claim 5, wherein:
 a. said separator means has a plurality of said duct means in a spaced relation therearound, and
 b. said inner wall has a plurality of openings extending therearound connecting said ducts.

7. A separator means as described in claim 6, wherein:
 a. said duct means has said duct outlet in the upper portion of said separator means adjacent said stalk-grain separator means,
 b. said duct means has said duct outlet in the center portion of said separator means,
 c. said duct means has said duct outlet in the lower portion of said separator means, and
 d. said grain collecting means has grain moving means therein in operation to move grain to the outlet thereof.

8. A separator means as described in claim 1, wherein:
 a. said separator means has a dehumidifier means having a compressor means secured said outer member, condenser coil means mounted within said separator means and a heat exchanger means mounted on an exterior portion of said outer member, and
 b. powering means for said compressor means.

9. A separator means as described in claim 8, wherein:
 a. said condenser coil means is positioned within said outer member in the recirculating airflow thereof,
 b. said compressor powering means has an eccentric and connecting rod means connected said mounted vertical axis, and
 c. said outer member has apertures therethrough adjacent said condenser means for the passage of condensed moisture.

* * * * *